June 10, 1941.  F. CHRISTIE  2,245,387
BAKING MACHINE
Filed Nov. 5, 1940  3 Sheets-Sheet 2

INVENTOR
FREDERIK CHRISTIE
BY
ATTORNEY

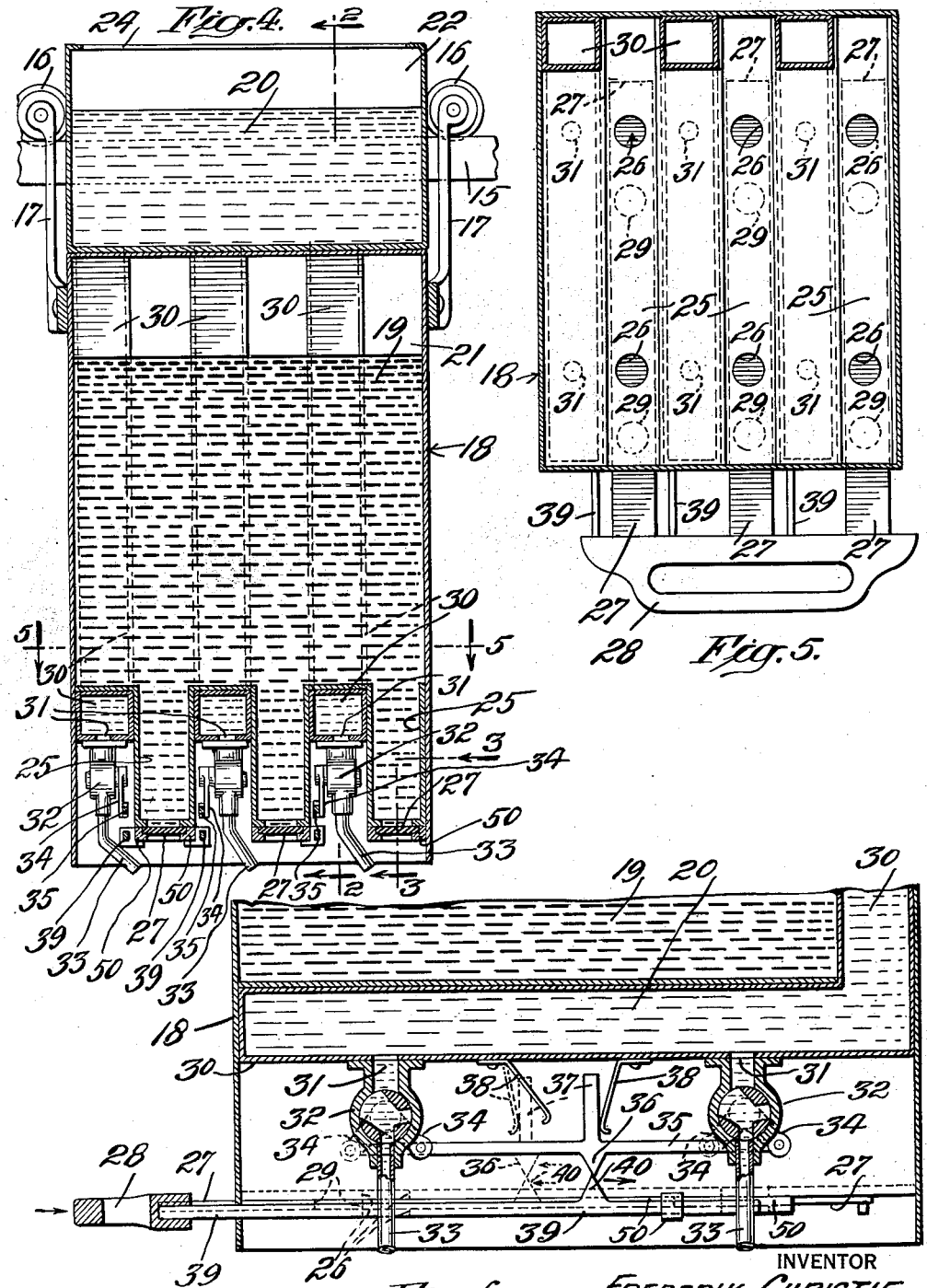

Patented June 10, 1941

2,245,387

UNITED STATES PATENT OFFICE 2,245,387

BAKING MACHINE

Frederik Christie, New York, N. Y.

Application November 5, 1940, Serial No. 364,381

8 Claims. (Cl. 107—66)

This invention relates to baking machines, and especially, but not necessarily, to machines used for producing an edible product, consisting of a sausage or "frankfurter" encased or enclosed in a roll which is baked around it.

One of the objects of the invention is to provide a novel means for supplying multi-cavity baking irons or molds with a supply of oil and batter so that the resultant baked products produced in the several cavities of the mold will be simultaneously and uniformly baked. With the improved structure, the several cavities of the mold are by a single reciprocating stroke of a manually operated control member, oiled, filled with batter, and again oiled so that the oiling and filling of the mold is speedily and effectively performed and the products can be rapidly turned out.

More particularly the invention contemplates the provision of a baking device having a plurality of molds or baking irons disposed over a heater, each of the molds or baking irons having a plurality of cavities in which the baked articles are produced, and mounted over the baking irons and movable so that the same may be positioned above one or the other of the irons is a batter and oil supply receptacle provided with means by which a single reciprocating stroke of a hand lever will result in the several cavities in any one of the molds being supplied with both oil and batter.

Figure 1:
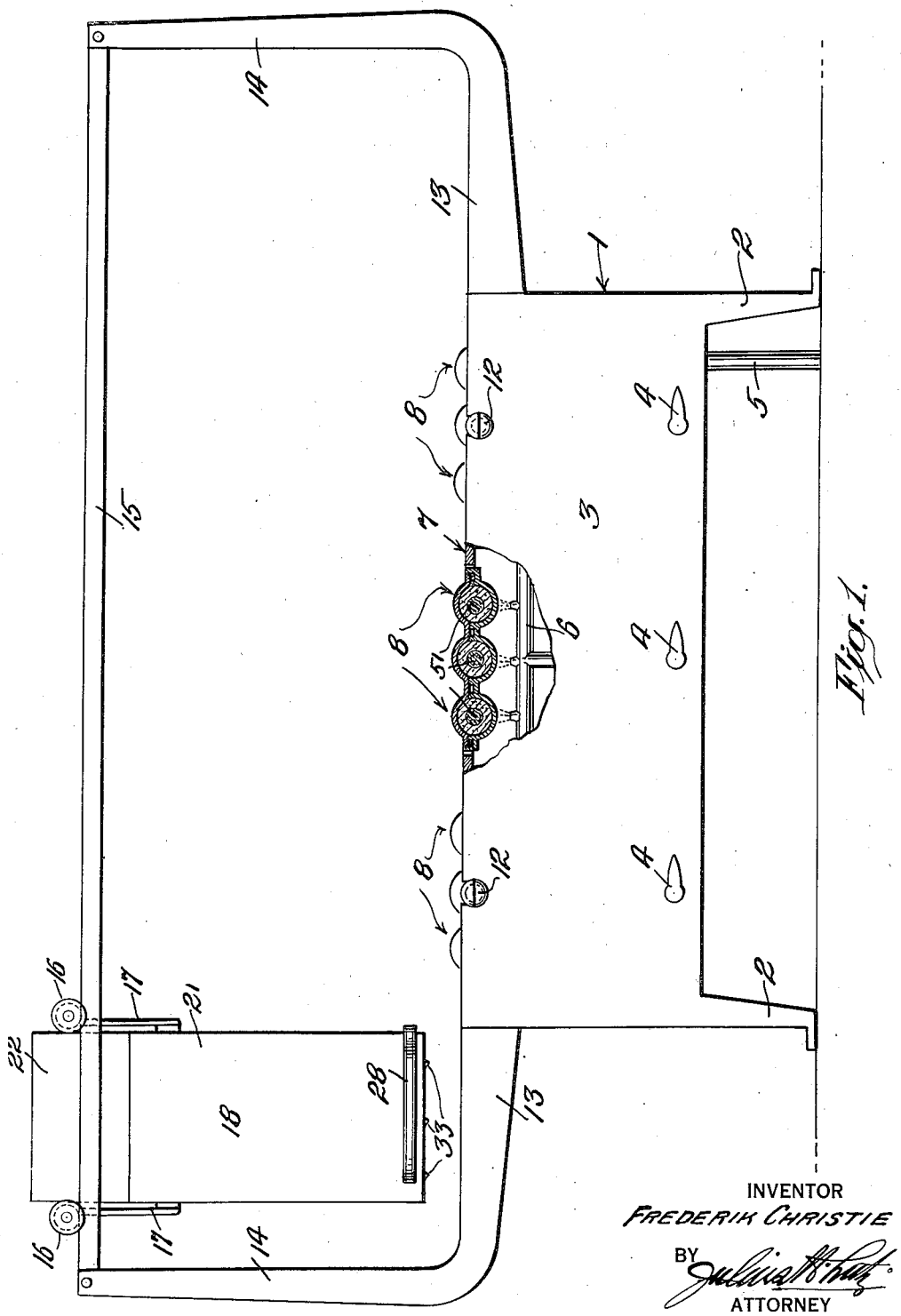
Figure 2:
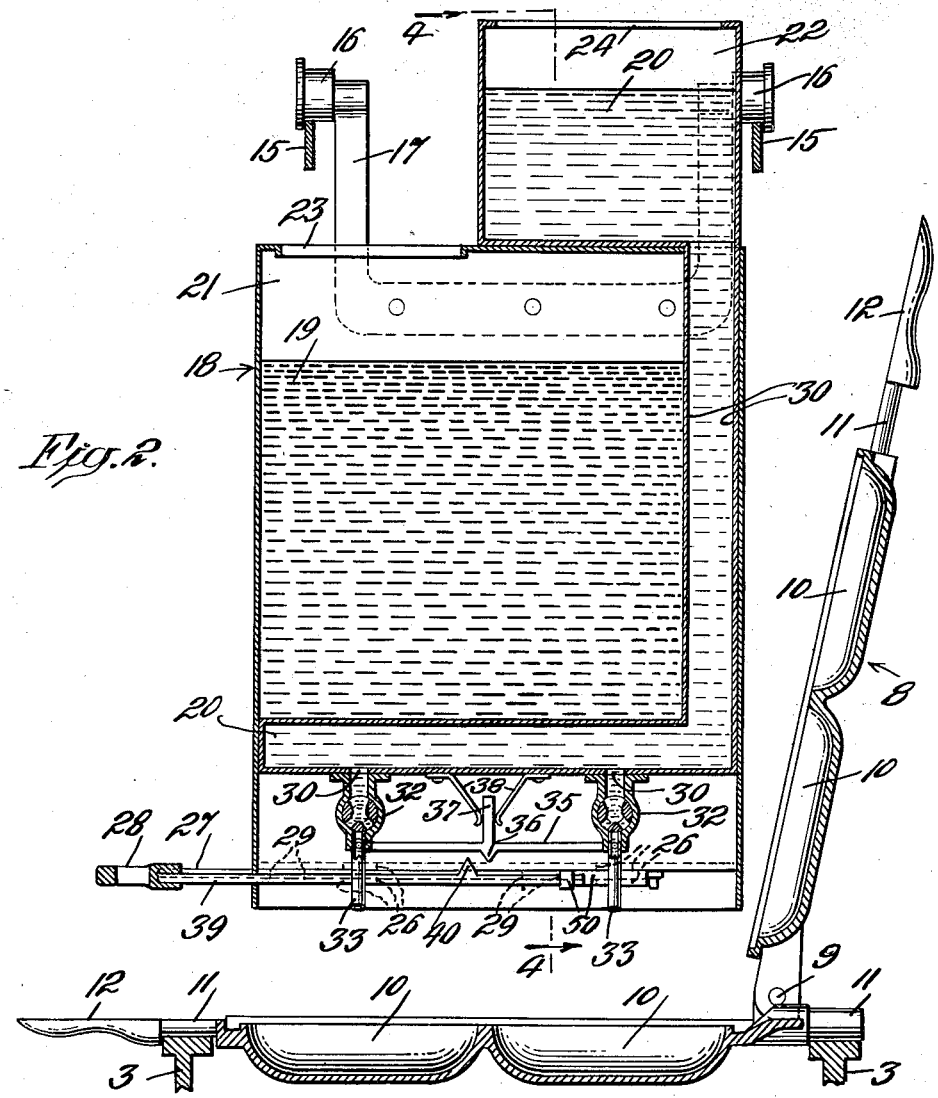
Figure 3:
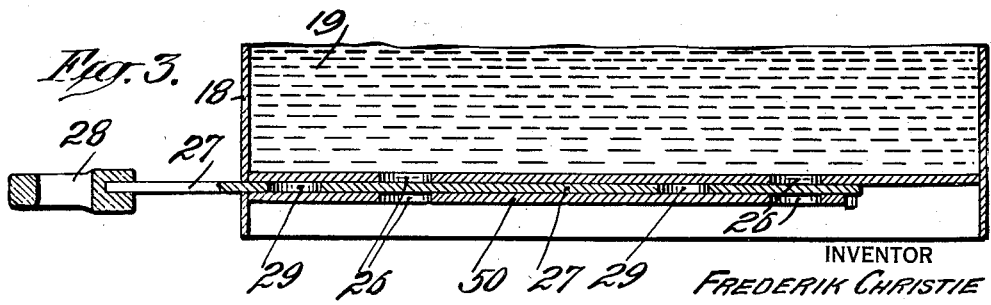

In the accompanying drawings forming a part hereof, Fig. 1 is a front elevation of a baking device made in accordance with the invention, with a part of the front plate of the device broken away to disclose construction; Fig. 2 is a vertical sectional view through the holder or receptacle for the batter and oil; Fig. 3 is a sectional view through the oil and batter supply holder, the same being taken on the line 3—3 of Fig. 4, looking in the direction of the arrows; Fig. 4 is a sectional view on the line 4—4 of Fig. 2, looking in the direction of the arrows; Fig. 5 is a sectional view on the line 5—5 of Fig. 4, looking in the direction of the arrows; and Fig. 6 is a vertical sectional view through the lower end of the oil and batter supply holder, showing the valve mechanism for the oil supply.

With reference to Fig. 1 of the drawings, 1 indicates generally the casing of the baking device, the same being supported upon suitable legs 2 and having a front plate 3 through which the control handles 4 of the valves of suitable gas burners 6 extend. The supply pipe 5 connects to a source of gas supply which it conveys to the burners 6 which are located below the top 7 of the baking device and which heat the molds. Mounted in the top 7 of the baking device are the baking irons or molds 8, three of which are shown in Fig. 1 of the drawings, although this number may be materially increased. Each of the molds or baking irons is in two parts hingedly connected together at 9 and each mold has six cavities indicated at 10. The molds are rotatably mounted in trunnions 11, so that either side of the mold may be presented downwardly or toward the flame from the gas burners 6. The projecting handle 12 permits the mold to be turned over or rotated in the manner explained. Extending from each of the opposite ends of the casing 1 is a pair of spaced arms 13 which have vertically disposed portions 14, connected at their upper ends by the horizontally disposed rails 15. There are thus two of these rails 15, the same being spaced apart a suitable distance to act as a track or support for rollers 16 rotatably mounted at the upper end of the arms on an upstanding bracket 17, one of each of which is secured to each side or end of the receptacle 18 in which the batter or dough mixture 19 as well as suitable oil 20 is contained. The container or receptacle 18 is divided into separate chambers 21 and 22, that shown at 21 containing the batter mixture 19. The chamber 22 contains the oil which is supplied to the interior of the mold cavities to prevent adherence or sticking of the baked product thereto. The top of the chamber 21 is provided with a filler opening 23 and a similar filler opening 24 is provided in the top of chamber 22.

The bottom of chamber 21 containing the batter 19 is provided with three narrowed portions 25, each of which is provided in its bottom with two holes 26, out of which the batter 19 may descend to fall into the cavities 10 of the opened mold over which the container 18 is positioned at the proper time. The outlet openings or holes 26 are normally closed by three valves in the form of sliding plates 27 connected together at one end by a handle 28 so that when the handle is moved, the three plates 27, constituting valves, are moved as a unit and will open or close the openings 26 as required. The normal or closed position of the handle 28 is that when the handle is drawn out as shown in Fig. 5 where it will be seen that the holes 26 are covered by the parts of the plates 27 so that at this time the batter is prevented from making its way out of the holes 26. Each of the plates 27 is mounted for sliding movement in the guides 50 and is provided with holes 29 of the same shape and size as those indicated at 26 and when the handle 28 is pushed inwardly or toward the receptacle 18 to its limit of inward movement, the holes 29 will register with those indicated at 26 and the batter may then descend out of the receptacle and fall into the mold cavities disposed directly below the aligned or registered openings 26 and 29. The operating handle 28 is also used for controlling the operation of valves connected to the outlet of the oil chamber 22, as will be presently described.

Leading downwardly from the bottom of the oil chamber 22 are three spaced passages 30 which extend forwardly below the batter holding compartment 21 and are located between the narrowed portions 25 thereof, as clearly seen in Fig. 4. Each of the horizontally disposed portions of the passages 30 is provided with two outlet openings 31, each of said openings being located above one of the mold cavities 10 when the receptacle 18 is positioned above any one of the molds 8. Each of the outlet openings 31 leads into a valve 32, the outlet end of each of said valves connecting to a bent tube or nozzle 33 so disposed as to direct the oil into one of the mold cavities. Each valve 32 is opened and closed by means of a swinging arm 34, the two arms of each pair of valves leading from each of the passages 30 being connected by a link 35 so that when the link is moved as will be presently explained, both valves are simultaneously opened or closed according to the direction of movement of said link. The link has a downwardly extending projection 36 and an upwardly extending lug 37 disposed between a pair of leaf springs 38, said springs tending to normally maintain the lug 37 centrally disposed between them and normally keeping both of the valves in each passage 30 closed.

Projecting inwardly from the handle 28 are three bars 39, each of which is guided in a part of one of the guides 50 and is formed with an upstanding projection or cam 40, adapted, when the handle 28 is thrust inwardly, to engage against the projection 36 on link 35 to shift said link inwardly and cause both valves 32 leading from each of the passages 30 to be opened whereby the oil may emanate from the spouts or tubes 33 and fall into the mold cavities disposed beneath them.

As will be seen in Fig. 6 when the handle 28 is manually pushed inwardly as indicated by the arrows in said figure, the projection 40 on each of the bars 39 will strike against the similar projection 36 on each link 35 and move the link inwardly and upwardly to cause both of the valves 32, connected by link 35, to be opened. As the handle continues its further inward movement, projection 40 passes beyond projection 36 and the rear spring 38, namely, that against which the lug 37 is shown in Fig. 6, will tend to push the link 35 toward the left which will immediately close the valves. When the handle is drawn out again on its return stroke, projections 40 will shift the link 35 toward the front of the receptacle and again open the valves 32 so that a second charge of oil will be delivered into the cavities of the molds on top of the batter which has just been deposited therein.

The operation of the device is as follows: The gas burners heat the molds or baking irons to the required temperature and then the receptacle 18 is manually moved along the tracks 15 to a position over any one of the molds 8 in which it is desired to deposit the batter. The molds may already contain a sausage or frankfurter 51 and when the receptacle is positioned over a mold to be filled, the upper half of the mold is manually raised or swung to open position as shown in Fig. 2. Then the handle 28 is pushed inwardly or toward the receptacle. By movement of the handle a relatively short distance, the projections 40 will operate against projections 36 on the links 35 and cause all valves 32 to be opened so that a charge of oil will be delivered into each of the bottom mold cavities then disposed below the spouts 33. As inward movement of the handle 28 continues valves 32 shut off and then the holes 29 in the plates 27 reach a position where they are disposed in registration with the holes 26 and the batter will pour out of the registered holes and be deposited into each of the mold cavities disposed below the aligned holes. At this point the handle 28 reaches the end of its inward stroke and it is next pulled outwardly or in an opposite direction. After a relatively short travel in the opposite direction, the projections 40 contacting with the projections 36, move the links 35 so as to cause the valves 32 to be again opened and a charge of oil is delivered on top of the batter in the molds, this latter charge of oil serving to lubricate the top portion of the mold, which is then manually brought down on top of the bottom half, the receptacle 18 having been first shifted out of the way by movement along the tracks 15.

From the foregoing, it will be obvious that by the structure disclosed, any one of the multi-cavity molds can be filled by merely moving the receptacle 18 to proper position above the selected mold and moving the handle 28 first in and then out.

While I have shown the invention as consisting of a baking device having a selected number of molds, it will be obvious that the number of molds employed may be varied and the general structure of the device may be arranged to suit various baking requirements. I have also herein described the device as being applicable in baking an edible product consisting of a sausage or frankfurter encased in a roll or other baked product. It will be obvious that the structure is capable of many baking uses and need not be exclusively employed for the product herein described. I therefore wish to be understood as illustratively describing the product and not to be limited thereto.

What I claim is:

1. In a device of the character described, a baking mold, a receptacle for containing both batter and a lubricant and mounted to be positioned above the mold, said receptacle having outlets for permitting batter to reach the mold when the receptacle is so positioned and having outlets for permitting lubricant to reach the mold, and a reciprocating control device for first opening the lubricant outlets, then closing the same and then opening the batter outlets and then closing the batter outlets and opening and closing the lubricant outlets upon a single reciprocating stroke of said control member.

2. In a device of the character described, a receptacle for containing a batter and a mold lubricant, outlet openings in the portion of the receptacle in which the batter is contained, outlet openings in the portion of the receptacle in which the lubricant is contained, valves for normally closing all of said openings, and a control member for first opening the lubricant openings and then closing the same and then opening the batter openings, then closing the batter openings and then opening and closing the lubricant openings on a single reciprocating stroke of said control member, and a mold into which the lubricant is first deposited, then batter and then lubricant upon operation of the control member as herein set forth.

3. In a device of the character described, a baking device comprising a receptacle for holding batter and a mold lubricant, means for supporting said receptacle over the molds, said means permitting shifting of the receptacle to position the same over any one of the molds, the receptacle having a compartment in which the batter is contained and also having a compartment in which the lubricant is contained, each compartment having outlets located over the mold over which the receptacle may be positioned, valves for controlling the flow of materials through said openings, and a single controlling member for first opening the valves for the lubricant, then opening the valves for the batter and then again opening the valves for the lubricant whereby first lubricant, then batter and then lubricant will be deposited in the mold over which the receptacle is located.

4. In a device of the character described, a mold having a plurality of cavities, a receptacle positioned over the mold, said receptacle having a batter compartment and a lubricant compartment, and a single operating member for first causing deposit of lubricant simultaneously into all of the mold cavities; then causing a deposit of batter therein and then causing a second deposit of lubricant therein.

5. In a device of the character described, a mold having a plurality of cavities, said mold being disposed over the heater, a receptacle positioned over the mold, said receptacle having a batter compartment and a lubricant compartment, and a single operating member for first causing deposit of lubricant simultaneously into all of the mold cavities; then causing a deposit of batter therein and then causing a second deposit of lubricant therein, said operating member being mounted for reciprocating movement and causing the deposit of said materials in the sequence named by a single reciprocating stroke.

6. In a device of the character described, a baking device comprising, a mold, a receptacle capable of being moved to position it above the mold, said receptacle having a compartment for holding batter, said receptacle having a compartment for holding a mold lubricant, valves for controlling the flow of materials from the several compartments, a sliding control member and means whereby the same will upon sliding movement first open the valves controlling the flow of lubricant, then open the valves for the batter and then again open the valves for the lubricant, in the sequence named.

7. In a device of the character described, a mold having a plurality of cavities, a filling device for simultaneously filling said cavities with a mold lubricant and batter, said filling device comprising a receptacle having separate compartments in which the batter and lubricant are respectively contained, each of said compartments having valves for controlling the flow of material therefrom, and valve-controlling means whereby first lubricant, then batter, then lubricant is deposited into the mold cavities in the sequence named upon manual operation of said valve-controlling means.

8. In a device of the character described, a plurality of multi-cavity molds, a two-compartment receptacle movably supported whereby it may be disposed over any one of the molds, valve-controlled outlets leading from one of the compartments, valve-controlled outlets leading from the second compartment, and a single valve control member by which one group of valves is first opened and closed and then the second group is opened and closed whereby two separate materials can be deposited in sequence in the cavities of the mold over which the receptacle is positioned.

FREDERIK CHRISTIE.